US007736456B2

(12) United States Patent
Branca et al.

(10) Patent No.: US 7,736,456 B2
(45) Date of Patent: Jun. 15, 2010

(54) PROCESS FOR PRINTING ACTIVES ONTO ARTICLES

(75) Inventors: Andrea Branca, Piano Di Sorrento (IT); Claudio Gemmiti, Spoltore (IT); Julian Ashton Plumley, Ontario (CA); David Sarro, Bad Soden a. T (DE); Domenico Esposito, S. Giovanni Teatino (IT)

(73) Assignee: The Procter & Gamble Company, Cincinnati, OH (US)

( * ) Notice: Subject to any disclaimer, the term of this patent is extended or adjusted under 35 U.S.C. 154(b) by 103 days.

(21) Appl. No.: 10/715,752

(22) Filed: Nov. 18, 2003

(65) Prior Publication Data

US 2004/0142110 A1 Jul. 22, 2004

Related U.S. Application Data

(63) Continuation of application No. PCT/US02/16894, filed on May 30, 2002.

(30) Foreign Application Priority Data

Jun. 2, 2001 (EP) ................................. 01113458

(51) Int. Cl.

| | |
|---|---|
| ***B44C 7/04*** | (2006.01) |
| ***B44C 1/22*** | (2006.01) |
| ***B29C 47/12*** | (2006.01) |
| ***B29C 47/06*** | (2006.01) |
| ***C09J 5/08*** | (2006.01) |
| ***B05B 7/06*** | (2006.01) |
| ***B05D 5/10*** | (2006.01) |
| *B44C 3/02* | (2006.01) |
| *B29C 47/26* | (2006.01) |
| *B29C 47/34* | (2006.01) |
| *B05B 13/00* | (2006.01) |

(52) U.S. Cl. .................. 156/244.25; 156/163; 156/230; 156/315; 118/304; 118/315; 427/256; 427/288; 427/428.06; 427/428.14; 427/428.17; 427/428.19; 427/428.21

(58) Field of Classification Search ................. 156/163, 156/230, 245, 250, 253; 427/256, 288, 428.06, 427/428.14, 428.17, 428.19, 428.21; 118/304, 118/315

See application file for complete search history.

(56) References Cited

U.S. PATENT DOCUMENTS 2,130,786 A * 9/1938 Bergstein .................... 118/211
2,236,005 A * 3/1941 Massey ...................... 118/227

(Continued)

FOREIGN PATENT DOCUMENTS

DE EP0978263 A1 * 8/1998

(Continued)

*Primary Examiner*—Philip C Tucker
*Assistant Examiner*—Sonya Mazumdar
(74) *Attorney, Agent, or Firm*—John G. Powell; Jay A. Krebs; George H. Leal

(57) ABSTRACT

A process for printing active materials, such as adhesives, onto articles, such as absorbent articles or release paper, using a coater with a multitude of applicators. The applicators coat a surface (roll) with a multitude of beads of the active material. The process also uses a specific coating blade, which contacts the surface with the active material at a certain angle and thereby coats the surface even better.

10 Claims, 4 Drawing Sheets

U.S. PATENT DOCUMENTS

| | | | | | |
|---|---|---|---|---|---|
| 2,531,036 | A * | 11/1950 | Goettsch | 118/212 |
| 2,589,966 | A * | 3/1952 | Rullo | 118/249 |
| 3,574,153 | A * | 4/1971 | Sirota | 428/350 |
| 3,762,365 | A * | 10/1973 | Herzog | 118/212 |
| 3,929,135 | A | 12/1975 | Thompson | |
| 3,972,763 | A | 8/1976 | Wolvin et al. | |
| 4,141,313 | A * | 2/1979 | Hefele | 118/212 |
| 4,147,580 | A * | 4/1979 | Buell | 156/291 |
| 4,324,246 | A | 4/1982 | Mullane et al. | |
| 4,342,314 | A | 8/1982 | Radel et al. | |
| 4,343,260 | A * | 8/1982 | Yajima et al. | 118/204 |
| 4,463,045 | A | 7/1984 | Ahr et al. | |
| 4,556,146 | A | 12/1985 | Swanson et al. | |
| 4,609,518 | A | 9/1986 | Curro et al. | |
| 4,629,643 | A | 12/1986 | Curro et al. | |
| 4,906,335 | A * | 3/1990 | Goodnow et al. | 162/281 |
| 4,950,254 | A | 8/1990 | Andersen et al. | |
| 5,006,394 | A | 4/1991 | Baird | |
| 5,064,492 | A * | 11/1991 | Friesch | 156/191 |
| 5,569,348 | A * | 10/1996 | Hefele | 156/239 |
| 5,695,376 | A * | 12/1997 | Datta et al. | 442/334 |
| 6,475,283 | B1 * | 11/2002 | Koehn | 118/684 |
| 6,531,025 | B1 * | 3/2003 | Lender et al. | 156/277 |
| 6,531,027 | B1 * | 3/2003 | Lender et al. | 156/291 |
| 7,040,063 | B2 * | 5/2006 | Leconte | 52/204.62 |
| 2003/0138570 | A1 * | 7/2003 | Kaylor et al. | 427/428 |
| 2004/0134596 | A1 * | 7/2004 | Rosati et al. | 156/230 |
| 2005/0198931 | A1 * | 9/2005 | Cesiro et al. | 53/461 |
| 2007/0065574 | A1 * | 3/2007 | Rosati et al. | 427/207.1 |

FOREIGN PATENT DOCUMENTS

| | | | |
|---|---|---|---|
| EP | 0 293 482 | A1 | 12/1988 |
| EP | 0 745 433 | A1 | 12/1996 |
| EP | 0 769 368 | A2 | 4/1997 |
| EP | 978263 | A1 * | 2/2000 |
| EP | 0978263 | A1 * | 9/2000 |
| JP | 02083058 | | 3/1990 |
| JP | 02139060 | | 5/1990 |
| JP | 10-272763 | | 10/1998 |
| JP | 2000-202350 | | 7/2000 |
| WO | WO 93/09741 | | 5/1993 |
| WO | WO 96/38113 | | 12/1996 |
| WO | WO 00/07533 | | 2/2000 |

* cited by examiner

PROCESS FOR PRINTING ACTIVES ONTO ARTICLES

CROSS REFERENCE TO RELATED APPLICATIONS

This application is a continuation of PCT/US02/16894 filed May 30, 2002.

FIELD OF THE INVENTION

The present invention relates to a process for printing active materials, such as adhesives, onto articles, such as absorbent articles or release paper, using a coater with a multitude of applicators, which coats a surface of a first tool (roll) with a multitude of beads of the active material, a specific coating blade and/or specific second tool (roll) arrangement. The invention also relates to articles obtainable by such a process and equipment specifically designed for the process.

BACKGROUND OF THE INVENTION

Absorbent articles such as sanitary napkins, panty liners, catamenials, incontinence inserts and diapers for adults or babies are commonly provided with an adhesive on their garment-facing surface to attach them during their usage period to a garment of the user, for example a pressure sensitive, hot melt, adhesive. These adhesives are typically covered with a release paper or strip prior to use.

More generally absorbent articles are provided with adhesive areas in order to combine the components that ultimately make up part or the whole of the absorbent article. In particular, multi-layer structures forming the topsheet, core or backsheet are often combined by adhesives called construction adhesives.

Typically these products are made by high-speed machinery. Current machinery includes equipment, such as spray guns or slot coaters that continuously or intermittently add the adhesive on the surface of an absorbent article. This needs to be done and can be done in a very fast manner, to ensure production at a very high speed.

One common drawback of all the above mentioned adhesive application processes is their inflexibility, inaccuracy relative to the shape of the adhesive to be applied.

For hollow drum screen-printing it is possible to create a pattern in the screen that would allow to create adhesive patterns. However, adhesive screen-printing is more restricted in providing an even, full surface adhesive coverage due to the maximum apertured dimensions and total open area of such a screen in respect to its stability.

Other proposed methods are for example described in WO 96/38113 and EP 745 433. These documents describe a method using a printing roll, which rotates through an adhesive bath and then contact the surface of an absorbent article, which passes on the top of the coating roll. The roll can contain a specific pattern of cavities and may be contacted with a scraper blade, so that excess material is scraped off and so that mainly the cavities are filled with the adhesive and thus, the pattern can be transferred to the absorbent article.

However, whilst the utilization of roll printing in principle also allows for the application of adhesives in patterns on surfaces, the process still has a number of problems associated with it. The print roll is continuously supplied with adhesive from an adhesive bath into which the roll is partially submerged and in which it is rotated. Naturally, the adhesive needs to be supplied in a large excess to allow the print roll to rotate through the adhesive bath and become coated with the adhesive. This of course requires a large amount of energy to be expended particularly in order to maintain the bath and adhesive at the required temperature. Moreover, the rotation of the roll within the bath causes the formation of air bubbles within the adhesive bath that results in the formation of foam. The foam is transferred to the roll and thereby results in the uneven distribution of the adhesive on the roll and consequently onto the substrate, even after scraping. Furthermore, the foam also collects on the scraper itself and is not readily removed there from whilst the process is operational.

Yet another problem with such a roll printing process is that the amount and distribution of adhesive that is deposited from the print roll onto the substrate is extremely difficult to control, resulting in a highly inefficient process. Also, the amount of stringing (i.e. fiberisation) during the transfer of the adhesive from the roll to the substrate surface is very large in this process. This results in an irregular application of the adhesive to the surface, in addition to contamination of the adhesive pattern itself.

As alternative process, WO 00/07533 suggest to replace the adhesive bath with a spraying tool or slot coater, positioned at the right or left hand side of the roll, which continuously applies an amount of adhesive onto a gravure printing roll with cavities, such that the cavities are filled to a certain extent only, which is then pressed against an absorbent article above the roll. A scraper blade may also be provided which scrapes off any excess adhesive.

Even in this alternative method, it has been found that it is difficult to apply sticky, stringy, viscous adhesives with precision, such that all cavities will contain the required amount of adhesive (e.g. if the volume of all cavities is the same, such that each cavity contains an equal amount of adhesive). This is in particularly the case when the process is performed at a high speed, such as normally necessary in economically feasible production processes, e.g. of more than 20 m/min, or even more than 100 m/min or even more than 150 m/min.

Furthermore, these known methods are such that the adhesive typically has to be heated to very high temperatures to be able to spray it, and that the temperature of the adhesive and the roll (or the difference between these temperatures) is difficult to control. Also whilst slot coaters can apply the adhesive very finely, the applied adhesive tends to clump together, seeking to minimize surface area. Thus an uneven application is obtained in practice. Furthermore, the adhesive applied with slot coaters tends to fly off the rotating gravure printing roll after application, especially when the adhesive clumps together and/or when they are very hot and more viscous.

Hence, there still exists a need to provide an improved (continuous) high speed process to apply such materials to articles, which overcomes the problem of the known processes as discussed above, and thus provides a more accurate and efficient way to apply materials including adhesives onto articles, typically in a shaped designs.

The inventors found that this is achieved by applying active materials, such as adhesives in a different manner. The active material is applied to the surface of a first tool (preferably a roll and typically a gravure printing roll with a pattern of cavities) by a coater unit having a multitude of applicators (extruders), which deposit a multitude of beads on the surface of the roll. The point of application of the coater is typically positioned above the first roll. Then preferably, a coating blade is pressed against the roll with a specific angle, to push the adhesive into the cavities. The coater blade is preferably positioned between the lowest point of the roll and the point where the adhesive is applied to the article. Then, the adhesive on the roll is brought in contact with the absorbent article, supported on a second tool, (preferably a roll, preferably being cooled and having a certain shore value of hardness).

Unlike the prior art processes, the process of the invention is such that the beads are formed in a precise way by the coater and remain as beads while on the surface; subsequently, they can be spread out to coat the surface evenly, for example by the preferred coater blade, as mentioned above. Also, the beads may be applied at lower temperatures than in prior art processes, using for example slot coaters. Also, because the beads are colder, they are stronger and thus do not fly off the surface after application. The process provides a much more accurate application of the active material onto the article: if the first surface is even, without cavities, a much more uniform and even application of the active material on the articles is achieved, compared to the prior art; if the surface has cavities which all have the same volume and serve to apply the adhesive in a dotted pattern onto the article, the dots have about the same size and about the same amount (weight) of adhesive. Thus, the articles have a more uniformly applied coating of the active material, either in the form of a uniform layer, or in the form of dots, which have uniformity in the amount of active per dot.

Furthermore, the process of the invention results in a significantly reduced level of contamination by stringing of the viscous material, i.e. due to the nature of the process, stringing of the material during application can be about avoided. This thus also helps to ensure that the adhesive or other active material is applied exactly as required, e.g. as a completely evenly applied layer, or in a very specific pattern, without built-up of string contamination.

The articles obtained by this process thus have a much more uniformly applied layer or (dot) pattern of the material, such as the adhesive, compared to the absorbent articles described or obtained in the prior art.

SUMMARY OF THE INVENTION

The present invention relates to a process for applying an active material onto an article, series of articles or web of articles, comprising the steps of:

a) applying said active material to a surface of a first tool in the form of a multitude of beads, with a coater unit having a multitude of applicators that are in close proximity to the surface, preferably positioned above the surface of said tool;

b) contacting the surface of the first tool containing the active material, with a coating blade which has an angle of between 5° and 40° (preferably 15° and 30°) with the tangent of the surface of the first tool, and which preferably applies a constant pressure onto the tool's surface with the active material;

c) transferring the active material from the surface of the first tool to an article, series of articles or web of articles, supported on a surface of a second tool and pressed against the surface of the first tool.

The invention also relate to a process for applying an active material onto an article, series of articles or web of articles, comprising the steps of:

a) applying said active material to a surface of a first tool;

b) transferring said active material from the surface of the first tool to an article, series of articles or web of articles, supported on a surface of a second tool and pressed against the surface of the first tool, characterized in that: either the active material in step a) is applied in the form of a multitude of beads with a coater having a multitude of applicators which are in close proximity to the surface of the first tool; or after step a) but before step b) the surface of the first tool is contacted with a coating blade which has an angle of 5° to 40° with the tangent of the surface of the first tool, preferably from 15° to 30° and which preferably applies a constant pressure onto said surface with the active material.

The first tool and second tool are preferably rotatable and thus rotating during the process. Preferred is that the first tool, and preferably the second tool, are rotatable, rotating rolls.

The invention also relates to a process using the above-described extruder and/or said coating blade and a specific second tool, preferably roll, as described herein after. This process is preferably such that when a web of articles is used, which is stretchable; the web is rotated around a second rotating tool, preferably a roll, such that the exit angle of the web is between 30° and 70°, preferably between 32° and 45°.

The printing process according to the present invention is preferably a gravure printing process, using as first tool a rotating gravure printing roll, having gravures or cavities in its surface. Preferably, the process is continuous, preferably having a very fast speed, as described herein, and preferably transferring a large amount of the active material per surface area, e.g. at least 10 $g/m^2$ as described herein.

The invention also relates to article obtainable by such processes, preferably comprising the active material in the form of a pattern on the articles, web of articles or series of articles.

The article is preferably an absorbent article or component or part thereof, preferably a (component or part of a) sanitary napkin, pantiliner, incontinence insert, adult or baby diaper. Preferably the article comprises at least a backsheet, as described herein, and the active material is applied herein on the backsheet of the article, which is to face the garment of the user. Also preferred may be that the article is a release strip of an absorbent article, typically to be attached to the backsheet of the article, and removed prior to use, and the active material is applied to this release strip.

The active material comprises preferably an adhesive, preferably also comprising a pigment.

The invention also relates to printing equipment having a coater, first tool and second tool and a coater blade, whereby the coater has a multitude of applicators having a pitch of less than 15 mm, or even less than 10 mm, preferably extruder applicators and the blade has an angle with the tangent of the first tool between 5° and 40°, or even between 15° and 30°; and whereby preferably the first tool, second tool and coater have a temperature controlling means and whereby preferably the second tool has a shore hardness value from 25 to 90.

Each of these steps of the processes of the invention, and preferably the combination of steps improve the accuracy and efficiency of the transfer of the active material on the articles. Thus, the process transfers the active material more completely from the first tool onto the articles, or typically, when the surface has cavities or gravures which receive the active material, the process of the invention is such that the active material is very efficiently and completely transferred from the cavities onto the articles, such that the gravure pattern is exactly transferred onto the articles, and so that every print of the gravure (corresponding to a cavity) onto the article is about equal in size, and amount of active material.

This is on one hand due to the fact that the coater system ensures a much more accurate and stable and evenly spreading beads of the active material onto the surface and thus a much more evenly or homogeneously application onto the articles, compared to known printing processes, using printing baths or slot coaters. On the other hand, the coater blade ensures that the adhesive is coated evenly over the surface of the tool and thus transferred more evenly or homogeneously onto the articles. When the surface comprises cavities of gravures, the coater blade also ensures that the active material is 'pushed' into the cavities in an even manner, which result in that an exact amount and shape is transferred onto the articles, and that every print produced by an equal cavity, onto the article is about equal in size, and amount of active material.

Preferably the articles are rotated on a second tool, in a specific manner, as described herein after.

A preferred process herein is part of a process for providing a (disposable) absorbent article comprising a first component and a second component material which are joined to one another by an adhesive active material, as described hereinafter. The components may be any of the materials typically utilized in the context of disposable absorbent articles. Another preferred process herein is part of a process to provide providing a (disposable) absorbent article comprising an adhesive active material on the backsheet, to be removably connected to the wearer's underwear, or a release strip comprising the active material and transferring this material to the absorbent article, when the strip is attached to said absorbent article, to thus provide an absorbent article with an adhesive, used to removably fasten the article.

The invention also provides a process for on-line production of packages comprising a pre-selected number of absorbent articles, which comprise a selected number of different active materials, such that at least two articles comprise different actives to one another, preferably each article only one different active material, the process comprising the steps of:

intermittently applying a first active material on at least a first absorbent article or part of a web of articles; and subsequently a second active material on a subsequent article or subsequent part of a web of articles; and optionally a further active material on a further subsequent article or on a further subsequent part of a web of articles; in the case of a web of articles, followed by cutting said web into individual articles having different active material; followed by on-line packing the thus produced articles having different active material, in the order of production, into a packaging material.

DETAILED DESCRIPTION OF THE INVENTION

Process

Figure 1:
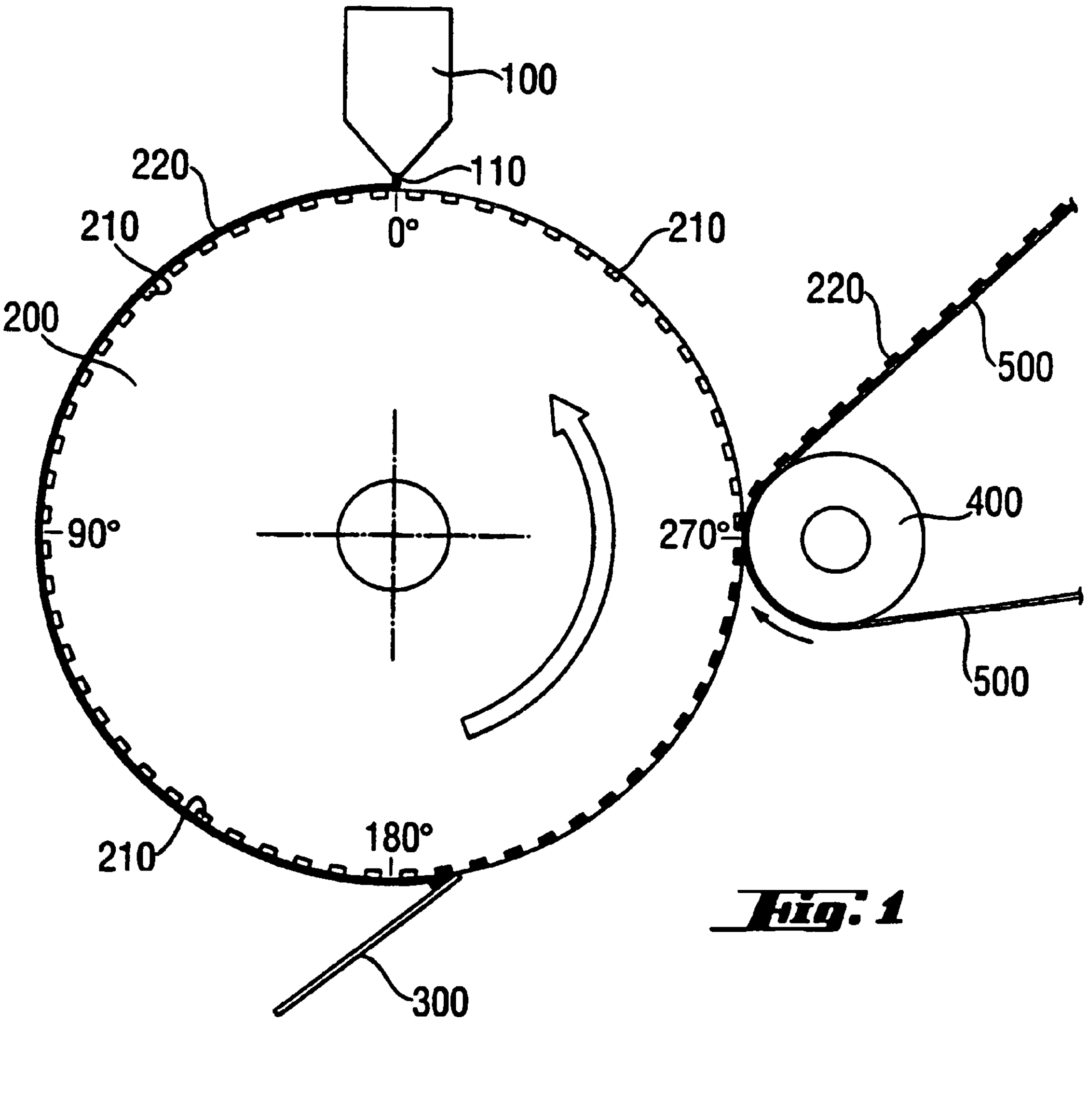
FIG. 1 shows a cross-sectional, schematic view of the printing equipment of the invention as used in printing process of the present invention.

The process of the invention is to apply an active material, preferably comprising an adhesive, onto an article, series of articles or web of articles, preferably a (web or series of) absorbent article or release strip thereof.

Preferably, the process is suitable to continuously transfer the material and therefore, the articles are preferably a continuous series of articles or a web of articles. Series of articles means herein that the articles are distinct, separate articles, whilst a web of articles means herein that the articles are connected, but are to be separated at a later stage into separate articles. Thus preferably, the material is applied continuously and preferably with a continuous speed, onto the surface (preferably a endless, rotating surface, such as a roll) and then continuously and preferably with a continuous speed transferred onto the articles.

The process (in particular when continuous) preferably has a speed of at least 20 m/min, more preferably at least 100 m/min, or even at least 150 m/min, i.e. a speed which is such that at least 20 m or at least 100 m or at least 150 m of articles with the material is produced per minute.

The process is preferably such that the material is applied in high on-dot amounts per surface area, preferably at least 10 $g/m^2$, preferably at least 20 $g/m^2$ or even at least 40 $g/m^2$ Thus if the material is applied in a pattern, with thus on purposely areas which are not covered, this on-dot amount per area is obtained by measuring the amount of material for a number of covered area only, excluding any uncovered areas, and calculating the average amount for this number of covered areas (and optionally transferred into $g/m^2$). Thus for example if 50% of a surface is covered with dots of the material and 50% is not covered (the purposely applied pattern thus being these dots), then the average weight per area of the total surface, having dots and uncovered parts, is half the on-dot weight per area. If the material is applied as to cover the whole surface area of the articles, the average weight per area of the total surface equals the on-dot area.

The process is characterized by a) a specific coater, which applies the active material in the form of a multitude of beads, the coater having an unit with a multitude of applicators (preferably extruders), which are in close proximity to the first tool, preferably positioned above the tool; and/or by b) a specific coater blade, having an angle with the tangent of the first tool of between 5° and 40°. For a curved tool, typically a cylinder or roll, this angle is thus the angle between the coating blade and the tangent line, which is the line grazing the curved surface of the curved tool in the point of contact with the coating blade and being perpendicular on the radius of the curved tool. If the surface of the tool is flat, the tangent equals the surface of the tool.

The coater applicator deposits a multitude of beads (shown in FIG. 1B, item 210) onto tool . Preferably, the process is continuous and the coater continuously applies such beads, which thus form endless beads on the tool. The coater applicator is preferably a unit having a multitude of applicators (shown in FIG. 1B, item 110), preferably extruders, or for example the coater is a unit, which extrudes the active material trough a die with a multitude of openings. The coater is typically positioned such that gravity aids the deposition of the material, e.g. that the applicator is positioned substantially above the surface of the tool.

Preferred is that the coater applied more than 2 beads onto the tool, typically at least 4 or even at least 5 or even at least 8, or even at least 12. The exact amount depends in particular on the width of the tool and the viscosity of the active material during application, and the spreadability of the material, in particular by the coater blade.

Preferred may be that the pitch (the shortest distance between the middle of one bead to the of the next bead, in direction of the width of the tool, is less than 20 mm, preferably less than 15 mm, or even less than 10 mm, or even less than 5 mm, but preferably more than 100 microns, or even more than 500 microns.

The individual opening of the applicators of the coater can have any shape, but preferably the openings are round, square, diamond-shaped, rectangular, or triangular, most preferably round.

The coater is preferably heated by a heating element with a heat control, to ensure a constant temperature of the active material applied by the coater. Preferred may be that the active material is for example applied at a temperature of between 70° C. and 250° C. or even 200° C., or even 80° C. to 190° C. or even to 170° C., or even 100° C. or even 110° C. to 160° C. The exact temperature typically depends on the (temperature-dependent) viscosity profile and/or elasticity profile of the active material applied in the process or with the equipment of the invention.

Preferred is that a pressure is applied onto the coater, as is the case in common extrusion processes, such that the active material exits the coater aided by this pressure. Preferred may be for example that the coater has an unit containing active material to be applied, which is under a certain pressure and which forces the active material through the individual openings, e.g. through a die with openings, or a through individual applicator tubes. The pressure also aids to apply the required amount per surface area of the tool and the pressure may thus be adjusted if the speed of the tool changes.

The coater is preferably fixed in one position, to apply a constant, continuous amount of active material onto the first tool; alternatively, a coater with a reciprocal movement may be useful in certain process application, for example intermittently coating the supply of the active material in line with the cavities pattern on the tool.

The first tool can have any dimension. It is preferably a tool with an endless surface, and thus preferably a rotatable/rotating tool. This may be for example a rotatable belt, or more preferably a roll. Preferred may be that the roll is cylindrical. The rotatable tool can rotate with any required speed. However, preferred herein is that the process is continuous and the speed is at least 10 m/min, preferably 100 m/min or even more, and thus, the length of the surface (length of one rotation) and thus for example the diameter of the roll and the speed of the tool are preferably adjusted to achieve this. Preferred diameters of rolls herein may be within the range of 50 mm and 3000 mm, more preferably 100 mm and 800 mm.

The first tool can have any width, typically depending on the size of the articles to be coated with the active material, the number of articles at a row to be coated at the same moment etc.

Typically, the tool is a roll and the coater, coater blade and second tool (preferably roll) are positioned around the first roll. Preferred is that the coater is positioned around the top of the roll, the coater blade past the lowest position of the roll (seen in the direction of rotation of the roll) and the second tool past the coater blade, as described herein after.

The first tool is preferably a gravure-printing roll that has cavities in its surface, which serve to receive the active material. The gravures or cavities can have any dimension. However, beneficial herein is that the cavities have a pitch, which is less than the pitch of the beads applied onto the roll. Preferred is that the pitch is less than 2 mm, preferably less than 1 mm. Preferred is also that the width or diameter of a single cavity is from 0.1 to 1.8 mm. Preferred is that the depth of the cavities is from 10 to 500 microns.

The surface of the first tool is preferably coated with a material, which provides a contact angle with the active material of at least 60°, or at least 70°, preferably at least 80°.

This can be determined by use if the sessile-drop method. Hereby, a drop of the active material in liquid state (e.g. melted) is applied onto a sample of the tool with an electronically software-controlled syringe used to generate the drop. The tool-sample and the syringe are fixed in an electrically controlled temperature control chamber (TC 350 ex Dataphysics).

Then the sessile drop is exposed to diffused light from one side and observed from the other side by means of the CCD camera of a video-supported contact goniometer (OCA20 ex Dataphysics). The contact angle is measured according to the following steps:

By means of the CCD camera a digital image of the drop on the tool is recorded. The position of the base line and also that of the drop contour is determined by calculating the difference of the brightness of one image spot to the adjacent area The drop contour and the base line then result from the position of the maximum differences between brightnesses, i.e. of the maximum contrast. Then, the drop contour line is matched to the measured drop outline with the Young-Laplace method. (In the Young-Laplace method, a curve is matched that exactly follows the drop outline. The drop shape is determined by the force equilibrium between surface tension and gravity. In the Young-Laplace method, the corresponding equation is solved numerically, with the solution being adapted to the previously determined drop outline by means of a parameter.) Then, the contact angle is measured as the angle between the surface of the tool-sample and the tangent to drop shape in the contact point with the surface.

This measurement can for example be done with a video-supported contact goniometer OCA20 ex Dataphysics, which determines the (static) contact angle according to the sessile drop method.

If the tool has cavities in its surface, it is preferred that this coating is present both between the cavities and in the cavities.

Preferred materials include polyfluorinated polymers. Preferred are coatings comprising a compound similar to Teflon, available from DuPont or similar to NF(3), available from Nanosol GmbH. Preferred are coating comprising Teflon, available from DuPont, and/or NF(3), available from Nanosol GmbH.

The first tool is preferably heated by a heating element and a temperature control, to ensure that the active material remains a certain temperature while on this tool, or at least a temperature within very narrow boundaries, typically up to 5° C. around an average temperature. Preferred temperatures are such that the tool or at least the surface thereof has a temperature, which is at least 5° C., or even at least 10° C., or even at least 20° C. more than the temperature of the active material leaving the coater (and thus typically the temperature of the coater when initially applied). When used herein, the 'process temperature' means this temperature of the surface of the first tool.

The first tool is contacted with a coater blade. The angle between the tangent of the tool (line perpendicular on the axis of the tool) and the coater blade typically is between 5° and 40°, preferably between 10° and 35° or even between 15° and 30°. If the first tool is moving, and the coating blade is typically not moving. Thus, when the first tool is moving in a certain direction, the angle is the angle between the tangent and the coating blade on the side where the tool is moving from, e.g. the opposite side to the direction of motion, as is also clear from the FIGS. 1 and 2 herein. It should be understood that the angle of the coater blade may be between the tangent and only the portion of the blade that is in contact with the first tool, or between the tangent and the blade as a whole. For example, the coater blade may have a bent top portion and only this top portion has the above-defined angle with the tangent of the tool. Preferred is though, that the coater blade is straight and that the blade as a whole has the above defined tangent angle.

The coater blade thereto typically has a constant pressure on the surface of the transfer tool. The coater blade preferably applies a constant pressure or force/length on the surface, preferably at least 600 N/m, preferably at least 700 N/m, or even 1000 N/m. Preferred may be that the coating blade is connected to a unit which can control this force/length, preferably connected with a pivot or spring.

The length of the blade can vary, but it is beneficial to keep the blade relatively short, preferably 1 to 20 cm, or even 5 to 15 cm, to ensure a more accurate constant force/length is applied on the first tool.

When the first tool is a roll, the blade is preferably positioned past the lowest point of the roll, seen from the direction of rotation of the roll. Preferred positions are described herein after.

The articles are supported on another, second tool that preferably is rotatable tool with an endless surface and it preferably rotates such that the articles are rotated and contacted with the first tool. Preferably, the second tool is a rotating belt or more preferably a roll, such as a cylindrical roll.

The second tool has preferably a surface with a shore hardness value of 25 to 90, preferably from 25 to 60, or even to 50. Preferred may be that the second tool has a surface made of a resilient material, such as rubber. This is the shore A value as measured by the method ASTM D-2240, version 2000.

Preferred is that the second tool is cooled, by a cooling element having a temperature control. Preferred is that the second is cooled such that the tool or at least the surface thereof has a temperature which is at least 20° C. less than the first tool, or even at least 50° C. or even at least 80° C. less or even at least 100° C. less. Preferred is that the second tool, or at least the surface thereof, is even cooled to a temperature between 0° C. and 30° C. or even 0° C. to 15° C.

Because the process is such that sticky materials can be transferred with reduced stringing and with improved accuracy and efficiency, the process can be done very fast. This has as advantage that even when the articles onto which active the material is applied have a melting point below the temperature of the material (or the transfer tool), the active materials can still be heated to such high temperatures, without causing the article to melt or deform. Thus, a preferred process herein is such that the process temperature, or the temperature of the active material is higher than the melting temperature of the articles. The temperature difference can for example be at least 10° C., or even at least 20° C. or even at least 30° C., and it can be as much as 80° C. or more typically up to 60 C or up to 45° C.

Preferably, is that when the web of articles is stretchable, and the transfer tool has a process temperature as defined herein above, that the web of articles rotates around the second roll such that the exit angle of the web and the roll is between 30° and 70°, preferably between 32° and 45°.

The force applied by the second tool, and the articles thereon, onto the transfer tool is preferably at least 700 N/m, preferably at least 1500 N/m or even 2000 N/m or more. This force is the force applied per unit width of the article. This can be calculated by determining the pressure applied on the second surface, for example by measuring the pressure applied by an air piston, used to control the pressure and attached to the second surface, and calculating the force applied by the piston from this pressure and the surface area of the piston whereon this pressure is applied. The force per unit width is then calculated by dividing the force with this width of the article.

The second tool can have any dimension, typically dependent on the dimension of the first tool and the dimension of the articles supported and rotated by the second tool.

The second tool is positioned past the coater blade, in the direction of rotation of the first tool. Preferred positions in relation to the first tool are described below.

The second tool may be under vacuum, such that the vacuum is applied through the second tool to the articles, which ensures the articles are more fixed on the second tool, during rotation and contacting of the first tool.

Preferred is that the process also involves the step of removing excess material applied on the first tool. This is in particular useful if the process involves a tool which has cavities to receive the material and only the material in the cavities is to be transferred to the articles and not the material present on the surface between the cavities, as described herein after in more detail. This can for example be done by scraping excess-material off, for example by a scraper blade, which contacts the first tool. Preferably such a scraper blade contacts the tool with a constant pressure.

Preferred hereto is that the coater blade used herein not only aids the even application of the active material and pushes it into the cavities, but meanwhile also scrapes off any excess material, which would otherwise result in on-even application between cavities or the application of too much material between cavities.

The articles, web of articles or series of articles obtainable by the process of the invention, have the active material applied in a homogeneous even layer, or in a pattern where the covered areas of the pattern (e.g. dots) have about the same amount of active material per surface area.

This can for example be reflected by the Coefficient of Variation (CoV) of the height of the applied active material and/or the CoV of the area of the applied active material. The CoV is defined as standard deviation divided by the average value, or the so-called reduced standard deviation, of the amount of active material of a certain area on which the active material is applied.

For example, when the article comprises a pattern of homogeneous dots, the homogeneous character is defined by the height-of-dot-CoV and area-of-dot-COV, for a certain area having a certain number of dots (thus, the CoV is being calculated for the dot area and the dot height measurements).

In the present invention the dot height CoV (%) for a surface area of the article having 30 dots is typically less than 6%, or even less than 5.5% or even less than 5%; or even less than 4.4%; the CoV (5) for the area per dot is typically less than 10% or even less than 8% or even less than 7% or even less than 6%.

The CoV has been determined from the area and the height of single dots, measured with Mikro CAD topographer from GFM. Area and height of single dots could be determined using standard equipment such as BioRad MRC 600 laser scanning confocal microscopy.

If the active material is applied evenly (and not in a pattern), the above CoV of height numbers apply for a surface area of 1 $cm^2$.

Active material

The material herein may be any material, which is printable. The process is in particular very advantageous for the printing of viscous or sticky material, typically, viscous and sticky materials.

The material is typically a sticky material, which has a peel force of more than 0.1 N/cm, or even more than 0.2 N/cm, or even more than 0.4 N/cm. This is the peel force of the active material when applied in an average base weight of 20 $g/cm^2$ on a surface, as described in the test below. Of course, the material can be applied in different amount on the articles herein.

The peel force can be determined as follows:

An article or part thereof comprising on one of its surfaces the active material in an amount such that the average base weight is 20 g/cm$^2$ (the sample and active being at room temperature), is placed on a rigid support with the surface with the active material facing upward, away from the support. The sample is fixed to the support by grips in a tightly and wrinkle-free manner. Then a piece of cotton (100%), known as Weave Style no.429W, available from Loeffler, is placed on top of the surface with the active material, such that one end of the cotton sample extends about 25 mm from the end of the sample with active material. Then, a weight is placed on the thus formed sample-cotton combination for 30 seconds, such that the whole combination is covered and a weight of 26-27 g/cm$^2$ is applied, to ensure that the combination is pressed in a gentle and even manner.

Then, a Zwick tensile tester (available from Zwick GmbH) is used to measure the peel force required to remove the cotton from the sample. Hereto, the support, sample covered by cotton is placed in the lower clamp of the tensile tester and the tail end of the cotton (the one opposite to the free 25 mm specified above) is placed in the upper clamp of the tensile tester. The Zwick tensile tester is set on a speed of 40 inch/minute. Typically the clamps are 250 mm spaced apart.

Then, within 1 minute after removal of the compression weight, the tensile tester is started and this will measure the force required (to peel off the cotton) along the displacement of the upper clamp, which moved in an angle of 180 with the sample. The peel force is calculated as the average of the force peaks over a 5 inches path. The first 1.0 inches and last 1.5 inches of the measurement are not taken into account by the calculation of the peel force, to avoid influences of acceleration and deceleration.

The above test is for example done on a sample of the shape and size of a regular Always pantiliner, using a support plate of 54×126 mm and a weight of 2.1 kg. The method can be easily adjusted by the skilled person for different sample sizes.

The material is preferably viscous (at the process temperature), which typically means that the material has a viscosity of more than 100 mPa.s, preferably more than 200 mPa.s, and preferably less than 5000 mPa.s or even less than 2500 mPa.s, or even less than 1500 mPa.s, at process temperature. The material is typically solid at 20° C. Preferred may be that the viscosity at process temperature is less than 1000 mPa.s or even less than 800 mPa.s. The process temperature when used herein is the temperature of the surface of the first tool (preferably thus of the first tool).

The viscosity can be measured using the method ASTM D3236-88.

The material preferably has an elastic modulus G' at 20° C. of less than 100,000 Pa, preferably less than 50,000 Pa or even less than 20,000 Pa.

The elastic modulus G', is measured by the method ASTM D4440-95, using flat plates oscillating at 1 Hz.

The material preferably also has an elastic modulus G' which increases from 10 to 10,000 Pa in less than 60° C. temperature range, preferably in a less than 40° C. temperature range or even in a less than 30° C. temperature range, or even less than 20° C. temperature range or even in a less than 10° C. temperature range. Such transition typically happens when the material passes from the melt state to the solid state.

The material preferably also has a loss tangent tan $\delta$ (G"/G') at 20° C. of more than 0.5 or even more than 1.0, or preferably more than 1.5, which can be calculated from the numbers for the elastic modulus G' and the viscous modulus G", as can be measured by the method ASTM D4440-95, mentioned above.

The material preferably also has a surface energy $\sigma$ at 20° C. of less than 35 mN/m, preferably less than 25 mN/m.

This can be measured by determining the contact angle of a liquid to a layer of the active material, in solid state. This can be measured according to the sessile drop method with typically a number of test liquids: the surface energy is then calculated from such contact angles with the Owens-Wendt-Rabel-Kaelbe method (combining data from a number of test liquids). For example, as liquids of different polarities, ethylene glycol, thiodiglycol, p-Cymol and diiodomethane are used.

The contact angle on a layer of active material for each liquid is calculated, using the method described herein, whereby the layer is fixed in a liquid temperature control chamber (TFC100) in the absence of air and thereto under dry nitrogen. Such an even layer of active material is obtained by prepared by applying a layer of the active material in molten state onto a glass slide, ensuring there are no air bubbles entrapped in the melt.

In a preferred embodiment of the invention, the viscous, sticky material comprises an adhesive.

Preferably, the process is to apply adhesives to absorbent articles, and therefore, the adhesive is preferably an adhesive to adhere different layers of the absorbent article together or the adhesive is an adhesive, which is to adhere removably. For example the adhesive serves to adhere fasteners of an absorbent article together, whilst allowing subsequent opening of the fasteners, or the adhesive serves to adhere the absorbent article to the wearer's underwear. In the latter case, the adhesive can be applied in the process herein on the absorbent article, typically on the backsheet thereof, or on a protecting release paper, which is removed by the user prior to adhering the absorbent article on to the garment (the release paper transferring the adhesive onto the absorbent article when the are connected during manufacturing). Preferred absorbent articles and uses of the adhesive are described hereinafter in more detail.

Typically, hot melt adhesives are useful herein. Preferably such hot-melt adhesives comprise a thermo-plastic base material, in combination with a tackifying resin, and mineral oils or waxes or a mixture of various such materials are preferred. Typical hot melt adhesives have a minimum melting temperature of about 80° C., often even about 100° C.

The requirement for these hot melt adhesives is of course that they maintain their adhesive performance until disposal of the disposable absorbent article, i.e. during manufacturing, storage, transport and use of the disposable absorbent article. Typically, the highest temperature after manufacture is the usage temperature at about 40° C. when the disposable absorbent article is used on the body of a human. However, higher temperatures can occur for example when articles are left in a vehicle in the sun, where temperatures of 60° C. and higher have been reported.

Preferred adhesives herein are Hot melt LAX307NE available from Savare'; Hot melt LAX3013NE, available from Savare'; Lunatack BD160, available from Fuller; National 134593A, available from national Starch. In particular an adhesive having the properties as defined above under a) to e) similar to Lunatack BD160, or of course Lunatack BD160 itself, are preferred.

Preferred may be that the material comprises a pigment, and thus that the transfer process or printing process results in an article having a colored material thereon. For example, the process may involve transferring a colored pattern onto an absorbent article, by transferring a material comprising a colored pigment; typically the material comprises from 0.1 to 10% of the pigment, more preferably from 0.3 to 5% by weight of the material. Preferred may be that the material is a combination of at least an adhesive as described above and a pigment.

Colored or color as referred to herein includes any primary/basic colors, e.g. black, red, blue, yellow, green, orange, violet, as well as skin color and any declination of the basic colors or mixture thereof.

Other materials, which are usefully transferred on articles, such as absorbent articles, by using the process herein, include hydrophobing agents, lotions, surfactants, antimicrobials.

Printing Equipment

The printing equipment herein has a specific coater, which can deposits a multitude of beads onto the tool. The coater has thus a multitude of applicators, preferably the coater has a coater has or is a unit having a multitude of applicators, preferably extruder tubes or an extrusion die.

Preferred is that the coater has more than two applicators (extrusion holes in die or extrusion tubes), typically at least 4 or even at least 5 or even at least 8, or even at least 12.

Preferred may be that the pitch (the shortest distance between the middle of one applicator opening to the next, in a direction of a row of applicators) is less than 20 mm, preferably less than 15 mm, or even less than 10 mm, or even less than 5 mm, but preferably more than 100 microns, or even more than 500 microns.

The individual opening of the applicators of the coater can have any shape, but preferably the openings are round, square, diamond-shaped, rectangular, or triangular, most preferably round.

The coater is preferably connected to or comprises an element with a heat control, to ensure a constant temperature of the active material applied by the coater. Preferred may be that the active material is for example applied at a temperature of between 70° C. and 250° C. or even 200° C., or even 80° C. to 190° C. or even to 170° C., or even 100° C. or even 110° C. to 160° C.

Preferred is that a pressure is applied onto the coater, and thus, that the coater is connected to a pressure source, such that the active material exits the coater aided by this pressure. Preferred may be for example that the coater is under a certain pressure which forces the active material through the individual openings, e.g. through a die with openings, or a through individual applicator tubes.

The coater is preferably fixed in one position, to apply a constant, continuous amount of active material onto the first tool; alternatively, a coater with a means to provide a reciprocal movement may be useful in certain process application, for example intermittently coating the supply of the active material in line with eh cavities pattern on the tool.

The coating blade herein is positioned in such an orientation to the first tool that the angle between the tangent of the tool (line perpendicular on the axis of the tool) and the coater blade typically is between 5° and 40°, preferably between 10° and 35° or even between 15° and 30°. Preferred is though, that the coater blade is straight and that the blade as a whole has the above defined tangent angle.

The first tool herein is preferably a rotating tool, such as a belt or a roll. Preferably, the first tool is a roll, preferably a gravure printing roll, having a surface with gravure cavities. Preferred is that the pitch of the cavities in the direction of the width of the tool is less than 2 mm, preferably less than 1 mm. Preferred is also that the width or diameter of a single cavity is from 0.1 to 1.8 mm. Preferred is that the depth of the cavities is from 10 to 500 microns.

The surface of the first tool is preferably coated with a material, which provides a contact angle with the active material of at least 60°, preferably at least 80°. If the surface has cavities, it is preferred that this coating is present both between the cavities and in the cavities. Preferred materials include polyfluorinated polymers. Preferred are coatings comprising a compound similar to Teflon, available from DuPont or NF(3), available from Nanosol GmbH. Preferred are coating comprising Teflon, available from DuPont; or NF(3), available from Nanosol Gmb H.

The first tool is preferably connected to or comprises a heating element and a temperature control, to ensure that the active material remains a certain temperature while on this tool, or at least a temperature within very narrow boundaries, typically up to 5° C. around an average temperature.

The second tool is preferably a rotatable tool with an endless surface, such as a rotating belt or more preferably a roll, such as a cylindrical roll.

The second tool has preferably a surface with a shore hardness value of 25 to 90, preferably from 25 to 60, or even to 50. Preferred may be that the second tool has a surface made of a resilient material, such as rubber. This is the shore A value as measured by the method ASTM D-2240, version 2000.

Preferred is that the second tool is connected to or comprises a cooling element having a temperature control.

Preferred is such that the second roll is positioned such that the web of articles rotates around the second roll such that the exit angle of the web and the roll is between 30° and 70°, preferably between 32° and 45°.

The force applied by the second tool, and the articles thereon, onto the transfer tool is preferably at least 700 N/m, preferably at least 1500 N/m or even 2000 N/m or more. This force is the force applied per unit width of the article. This can be calculated by determining the pressure applied on the second surface, for example by measuring the pressure applied by an air piston, used to control the pressure and attached to the second surface, and calculating the force applied by the piston from this pressure and the surface area of the piston whereon this pressure is applied. The force per unit width is then calculated by dividing the force with this width of the article.

The second tool can have any dimension, typically dependent on the dimension of the first tool and the dimension of the articles supported and rotated by the second tool.

The second tool may be connected to or comprise a vacuum means, such as a vacuum pomp or chamber, so that the second tool is under vacuum, which ensures the articles are more fixed on the second tool, during rotation and contacting of the first tool.

Packing Process

The invention also provided a process for on-line production of packages comprising a pre-selected number of absorbent articles, which comprise a selected number of different active materials, preferably each article only one different active material. The process comprises the steps of: (intermittently) applying a first active material on at least a first absorbent article or part of a web of articles; and subsequently a second active material on a subsequent article or subsequent part of a web of articles; and optionally a further active material on a further subsequent article or on a further subsequent part of a web of articles; optionally followed by cutting said web into individual articles having different active material; followed by on-line packing the thus produced articles having different active material, in the order of production, into a packaging material.

'Different' when used herein means that one article or active material is different to another article or material in so far as chemical properties or physical properties is concerned. Preferred is that the active materials differ at least in chemical properties.

Thus preferably a continuous process is used to apply different active materials onto the same type of articles, for example alternating the application of one active material and a subsequent active material from one article to the next. The process thus produces a series of different articles, which are directly and preferably continuously packed into packaging material, i.e. on-line. Thus, by setting the intermittent application of different material such that the on-line production result in the required combination of articles with different material, the articles do not need to be collected per type (and temporarily stored), before subsequently being packed in packaging material in certain amounts of one type and certain amounts of another. The present process is thus much less time consuming and thus much more efficient.

Preferably, one or more of the different active materials is/are applied by a process as described herein above, using the specific coating step and/or coater, and/or the specific coating blade etc.

Preferably, a first active material comprises a first pigment and has thus a certain color, whilst a subsequent active material is at least different in so far as it comprises no pigment, or a different, second pigment. Thus, a packaging is preferably obtained which comprises a plurality of (disposable) absorbent articles having different colors, i.e., which are visually distinct from one another, and which thus can be easily recognizable by visual inspection. Color difference between two absorbent articles might also be evaluated by using a colorimeter like for instance Colorimeter Minolta mode CR-300® instrument.

The package thus preferably comprises only one type of absorbent articles in at least two different colors. Indeed where at least two types of absorbent articles are present, the first type has at least one color and the second type has at least another color, or at least one type is present in at least two different colors.

Typically the package herein comprises from 2 to 100 separated absorbent articles, preferably from 5 to 40 and more preferably from 12 to 35. In the embodiment herein wherein the package contains a certain number of a first and a second articles, as defined herein, the numbers of the first absorbent articles to the numbers of the second absorbent articles are in a ratio of 1:10 to 10:1, preferably around 1:1.

Packages for absorbent articles according to the present invention include those constructed as cartons and/or flexible packages, such as pouches and bags. Standard materials used to construct packages, include but are not limited to paperboard, polymeric film, such as polypropylene films, polyethylene films, co-extruded polyethylene and ethylene vinyl acetate films and the like, and coated paper. The package is formed through manipulation of a single sheet of material, such as folding, folding and sealing portions, by adhering multiple sheets to one another or a combination thereof. The package is sealed or adhered by means known in the art, such as heat seal, ultrasonics, adhesives, hook and loop fasteners and the like. Preferably, paperboard and adhesives are used to construct a carton package according to the present invention.

The package can optionally have opening and closure means to enable a user to easily retrieve individual absorbent articles as needed and then close the package to keep the absorbent articles clean and discreetly contained. The opening and closure means can include, but are not limited to flaps activated by applying force to lines of weakening, pursing systems, such as with string, pressure sensitive adhesives, hot melt adhesives, hook and loop fasteners, tab and slit, and interlocking rib and groove strips. Preferably a paperboard carton with a tab and slit closure means is employed according to the present invention.

The absorbent articles can be packaged directly within the package as described herein or they may be individually folded and wrapper within a pouch, an example of which is disclosed in U.S. Pat. No. 4,556,146.

Absorbent Articles

The absorbent article of the present invention comprises the specific material as described above, preferably an adhesive as described above.

The absorbent article is preferably a disposable absorbent article, or component thereof. The components typically include one or more of: a wearer facing surface, typically provided by a liquid permeable substrate of fibrous or film like structure often called topsheet; a garment facing surface, preferably provided by a liquid impermeable substrate, referred to as a backsheet which is preferably also moisture vapor permeable and hence breathable and, an absorbent structure placed between the wearer facing surface and the garment facing surface, typically termed the absorbent core. The different features are herein also referred to as components.

The absorbent article can also comprise any of the components or features usual in the art, in particular side wrapping elements, side flap components, or wings as well as any sort of extensibility or elastication feature. In the production of absorbent articles several adhesive connections are typically formed, which can be applied with the process according to the present invention. For example, a typical sanitary napkin or panty liner comprises an adhesive area on the garment facing surface of the backsheet providing panty-fastening, the adhesive typically being covered by a release paper, wrapper or the like prior to use of the article and removed prior to use to attach it to the garment.

The absorbent article for absorbing liquid is described below by reference to a sanitary napkin or panty liner. However products such as adult or baby diapers, or incontinence products comprising adhesives can similarly benefit from the process of the present invention.

Each of said components of the absorbent article comprise at least one layer that has a wearer facing surface and a garment-facing surface. Typically, garment-facing surfaces form a common interface with the wearer-facing surface of an adjacent component or layer. The components or layers are joined together across this common interface. In this manner, the topsheet is joined to the absorbent core, and the core is joined to the backsheet. Furthermore, each of said topsheet, backsheet and core components may comprise more than one layer and these layers may also be similarly joined. In addition, the topsheet may be directly or indirectly joined to the backsheet at the periphery of the absorbent article and in the wings if present. Furthermore, particularly for sanitary napkin, panty liner and incontinence product applications, the garment facing surface of the backsheet provides the surface to which the absorbent article is joined to the garment of the user of the product to provide the panty fastening adhesive. Similarly if the product is a winged product, the wings are also provided with adhesive in order to secure the wings to the garment-facing surface of the undergarment. These surfaces are typically provided with protective covers that are removed prior to use.

Thus, the absorbent article of the invention is typically such that at least one of the wearer or garment facing surfaces of the topsheet, core or backsheet components comprises an active material as defined herein, preferably applied according to the process of the present invention. Preferably, this is an adhesive. Preferably, at least the garment-facing surface of the backsheet is applied with an adhesive area according to the present invention. More preferably at least the garment facing surface of the backsheet and at least one other surface are joined to another by application of the adhesive area of the present invention and most preferably all of the common interfaces of the components of the article are joined together by the application of adhesive in the manner of the present invention.

The absorbent articles of the invention will now be described with reference to the application of a panty-fastening adhesive to the garment-facing surface of the backsheet. However, as discussed herein above the invention is equally applicable for the adhesion of the common interface between any of the other surfaces of the components of the absorbent article. Typically, at least a portion of the garment-facing surface of the backsheet is coated with typically a pressure sensitive adhesive as described herein above, to form the panty fastening adhesive. Prior to use of the absorbent article the panty fastening adhesive is typically protected from contamination and from adhering to another surface where this is not desired, by a protective cover means such as a silicone coated release paper, a plastic film or any other easily removable cover. The protective cover means can be provided as a single piece or in a multitude of pieces e.g. to cover the individual adhesive areas. It also can perform other functions such as provide individualized packaging for the article or provide a disposal function. Any commercially available release paper or film may be used. Suitable examples include BL 30MG-A SILOX EI/O, BL 30 MG-A SILOX 4 P/O available from Akrosil Corporation, and M&W films available from Gronau in Germany, under the code X-5432.

If protective side flaps or wings-are present then they may also be provided with optional fasteners thereon for additional security. The fasteners assist the protective side flaps to remain in position after they have been wrapped around the edges of the crotch surface of the undergarment by adhering to the garment-facing surface of the undergarment. Hence, the adhesive area applied in the wings is typically independent from the adhesive area applied as the so-called panty fastening adhesive on the backsheet. The fasteners of the side flaps may also be applied with adhesive areas according to the present invention and/or using the process of the invention, and are typically also covered with a protective cover means.

The topsheet is preferably compliant, soft feeling, and non-irritating to the wearer's skin. The topsheet also can have elastic characteristics allowing it to be stretched in one or two directions in portions of the topsheet or throughout its extension. Further, the topsheet is typically fluid pervious permitting fluids (e.g., menses and/or urine) to readily penetrate through its thickness. A suitable topsheet can be manufactured from a wide range of materials such as woven and non-woven materials; polymeric materials such as apertured formed thermoplastic films, apertured plastic films, and hydroformed thermoplastic films; and thermoplastic scrims. Suitable woven and nonwoven materials can be comprised of natural fibers (e.g., wood or cotton fibers), synthetic fibers (e.g., polymeric fibers such as polyester, polypropylene, or polyethylene fibers) or from a combination of natural and synthetic fibers or bi-/multi-component fibers. Preferred topsheets for use in the absorbent articles herein are selected from high loft nonwoven topsheets and apertured formed film topsheets. Apertured formed films are especially preferred for the topsheets because they are pervious to body exudates and yet non absorbent and have a reduced tendency to allow fluids to pass back through and rewet the wearer's skin. Thus, the surface of the formed film that is in contact with the body remains dry, thereby reducing body soiling and creating a more comfortable feel for the wearer. Suitable formed films are described in U.S. Pat. Nos. 3,929,135; 4,324,246; 4,342,314; 4,463,045; and 5,006,394. Particularly preferred micro apertured formed film topsheets are disclosed in U.S. Pat. Nos. 4,609,518 and 4,629,643. A preferred topsheet for the present invention comprises the formed film described in one or more of the above patents and marketed on sanitary napkins by The Procter & Gamble Company of Cincinnati, Ohio as "DRI-WEAVE". The body surface of the formed film topsheet can be hydrophilic so as to help liquid to transfer though the topsheet faster than if the body surface was not hydrophilic. In a preferred embodiment, surfactant is incorporated into the polymeric materials of the formed film topsheet such as is described in PCT-publication WO 93/09741. This can be a sticky material as defined herein and can thus also advantageously be applied by the process of the present invention.

Alternatively, the body surface of the topsheet can be made hydrophilic by treating it with a surfactant such as is described in U.S. Pat. No. 4,950,254. This can also be a viscous, sticky material as defined herein and can thus also advantageously be applied by the process of the present invention.

The absorbent article typically has an absorbent core, which may be selected from any of the absorbent cores or core system known in the art. As used herein the term absorbent core refers to any material or multiple material layers whose primary function is to absorb, store and distribute fluid. The absorbent core can include the following components: (a) an optional primary fluid distribution layer preferably together with a secondary optional fluid distribution layer; (b) a fluid storage layer; (c) an optional fibrous ("dusting") layer underlying the storage layer; and (d) other optional components.

These can for example be adhered together by the adhesive defined herein, and this can be done using the process of the invention.

The fluid storage layer can comprise any usual absorbent material or combinations thereof. It preferably comprises absorbent gelling materials usually referred to as "hydrogel", "superabsorbent", hydrocolloid" materials in combination with suitable carriers. The absorbent gelling materials are capable of absorbing large quantities of aqueous body fluids, and are further capable of retaining such absorbed fluids under moderate pressures. The absorbent gelling materials can be dispersed homogeneously or non-homogeneously in a suitable carrier. The suitable carriers, provided they are absorbent as such, can also be used alone.

Suitable absorbent gelling materials for use herein will most often comprise a substantially water-insoluble, slightly cross-linked, partially neutralised, polymeric gelling material. This material forms a hydrogel upon contact with water. Such polymer materials can be prepared from polymerizable, unsaturated, acid-containing monomers that are well known in the art.

Suitable carriers include materials, which are conventionally utilized in absorbent structures such as natural, modified or synthetic fibers, particularly modified or non-modified cellulose fibers, in the form of fluff and/or tissues. Suitable carriers can be used together with the absorbent gelling material; however, they can also be used alone or in combinations. Most preferred are tissue or tissue laminates in the context of sanitary napkins and panty liners.

The absorbent structure may comprise a double layer tissue laminate formed by folding the tissue onto itself. These layers can be joined to each other for example by adhesive, as defined herein, using the process of the invention, or by mechanical interlocking or by hydrogen bonds. Absorbent gelling material or other optional material can be comprised between the layers.

Modified cellulose fibers such as the stiffened cellulose fibers can also be used. Synthetic fibers can also be used and include those made of cellulose acetate, polyvinyl fluoride, polyvinylidene chloride, acrylics (such as Orlon), polyvinyl acetate, non-soluble polyvinyl alcohol, polyethylene, polypropylene, polyamides (such as nylon), polyesters, bicomponent fibers, tricomponent fibers, mixtures thereof and the like. Preferably, the fiber surfaces are hydrophilic or are treated to be hydrophilic. The storage layer can also include filler materials, such as Perlite, diatomaceous earth, Vermiculite, etc., to improve liquid retention.

The backsheet primarily prevents the absorbed matter and/or the matter contained in the absorbent structure from wetting articles that contact the absorbent product such as underpants, pants, pyjamas and undergarments. The backsheet is preferably impervious to liquids (e.g. menses and/or urine) and is preferably manufactured from a thin plastic film, although other flexible liquid impervious materials can also be used. As used herein, the term "flexible" refers to materials that are compliant and will readily conform to the general shape and contours of the human body. The backsheet also can have elastic characteristics allowing it to stretch in one or two directions. The backsheet typically extends across the whole of the absorbent structure and can extend into and form part of or all of the preferred side flaps, side wrapping elements or wings. The backsheet can comprise a woven or nonwoven material, polymeric films such as thermoplastic films of polyethylene or polypropylene, or composite materials such as a film-coated nonwoven material.

Preferably, the backsheet is a polyethylene film having a thickness of from about 0.012 mm (0.5 mil) to about 0.051 mm (2.0 mils). Exemplary polyethylene films are manufactured by Clopay Corporation of Cincinnati, Ohio, under the designation P18-0401 and by Ethyl Corporation, Visqueen Division, of Terre Haute, Ind., under the designation XP-39385. The backsheet is preferably embossed and/or matt finished to provide a more cloth like appearance.

Further, the backsheet is preferably such that it permits vapors to escape from the absorbent structure, i.e. be breathable, while still preventing extrudates from passing through the backsheet. Also breathable backsheets comprising several layers, e.g. film plus non-woven structures, can be used. Such backsheets thus comprise at least one gas permeable layer. Suitable gas permeable layers include 2 dimensional, planar micro and macro-porous films, macroscopically expanded films, formed apertured films and monolithic films. The apertures in said layer may be of any configuration, but are preferably spherical or oblong and may also be of varying dimensions. The apertures preferably are evenly distributed across the entire surface of the layer, however layers having only certain regions of the surface having apertures are also envisioned. Suitable materials are for example Gortex (TM) or Sympatex (TM) type materials well known in the art for their application in so-called breathable clothing. Other suitable materials include XMP-1001 of Minnesota Mining and Manufacturing Company, St. Paul, Minn., USA and Exxaire XBF-101W, supplied by the Exxon Chemical Company.

As used herein the term 2-dimensional planar layer refers to layers having a depth of less than 1 mm, preferably less than 0.5 mm, wherein the apertures have an average uniform diameter along their length and which do not protrude out of the plane of the layer. The apertured materials for use as a backsheet in the present invention may be produced using any of the methods known in the art such as described in EPO 293 482 and the references therein. In addition the dimensions of the apertures produced by this method may be increased by applying a force across the plane of the backsheet layer (i.e. stretching the layer). Suitable apertured formed films include films that have discrete apertures that extend beyond the horizontal plane of the garment facing surface of the layer towards the core thereby forming protuberances. The protuberances have an orifice located at its terminating end. Preferably said protuberances are of a funnel shape, similar to those described in U.S. Pat. No. 3,929,135.

Particularly preferred backsheets for the present invention comprise at least two layers comprising at least one layer selected from the above, such as microporous and apertured formed films and an additional layer which may also be selected from the above listed backsheets or may be a fibrous woven or nonwoven. The most preferred breathable backsheet component comprises a microporous film and an apertured formed film or an apertured formed film and a hydrophobic woven or nonwoven material.

Preferred Process Steps of the Process of the Present Invention

In the following the process according to the present invention will be described with reference to the drawings. In FIG. 1 a schematic cross-sectional view of preferred printing equipment is shown.

Figure 1B:
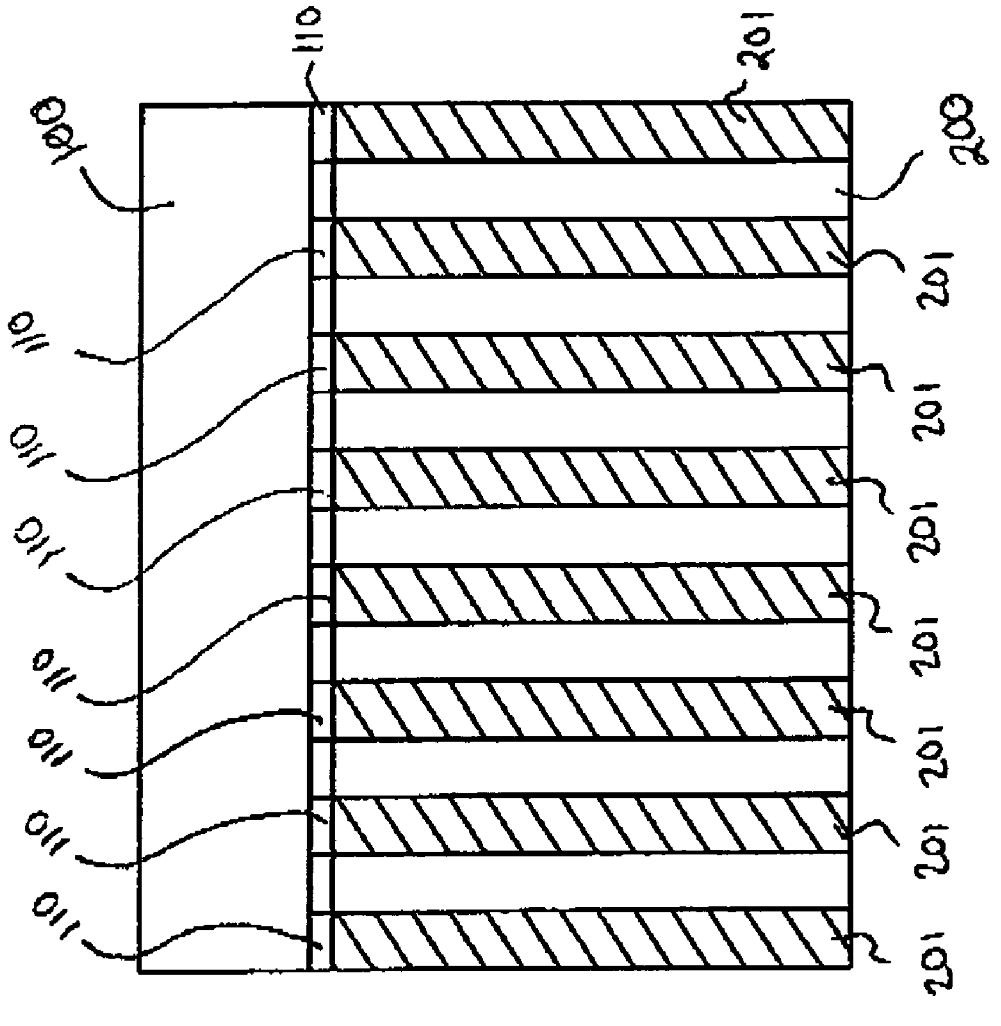
FIG. 1B is a side view showing a roll, a coater, and applicators of the printing equipment of FIG. 1.

The coater (100) has a multitude of applicator units 110 in a row, as shown in FIG. 1B. The coater (100) applies via the applicator units (110) an active material, here an adhesive (220) on to the surface of a first roll (200), so that a multitude of continuous beads (shown in FIG. 1B, item 201) of adhesive (220) are present on the surface of the first roll (200), including in the gravure cavities (210) of the surface of the first roll (200).

The direction of rotation of the first roll (200) is indicated and the positions of the coater (100), coater blade (300) and second roll (400) are indicated in degrees of the circle which the cross-section of the first roll (200).

The coater (100) is in FIG. 1 positioned at the top of the first roll (200) and thus at 0°. The coater (100) may be positioned at any position provided it is before the position of the second roll (400), in direction of rotation. Preferred may be that the coater (100) is positioned between 45° and 315°, preferably 10° and 350°, or thus at 0°.

The first roll (200) with the beads of adhesive (220) rotates towards the coater blade (300). The coater blade (300) is shown in more detail in FIG. 2.

Figure 2:
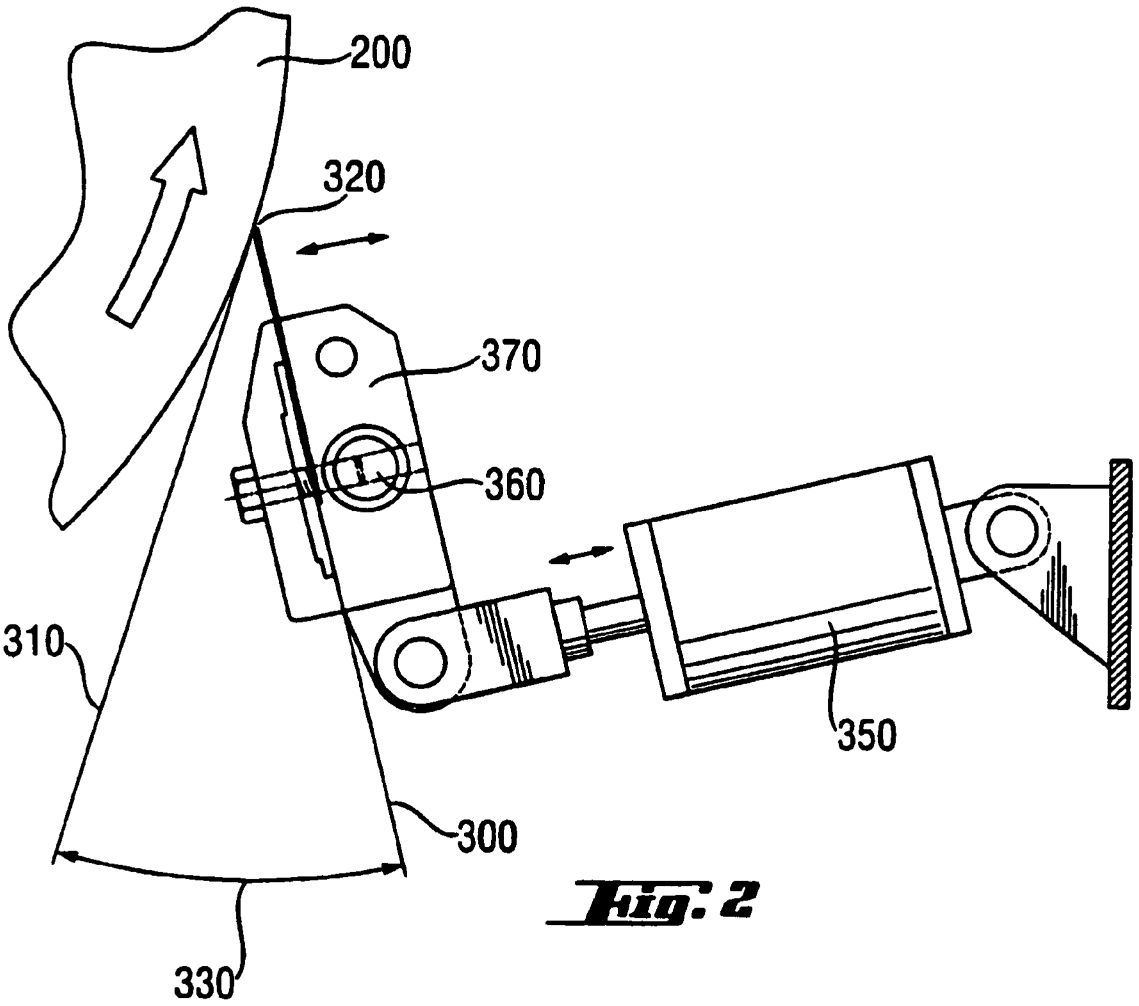
FIG. 2 shows an enlarged, detailed schematic cross section of the first tool-coater blade-arrangement as used herein.

The coater blade (300) contacts the first roll (200) such that the angle (330) of the coater blade top (320) and the tangent (310) of the first roll (200) in the contact point (320) is between 4 and 45, preferably between 15 and 30, as shown in FIG. 2. The pressure of the coating blade (300) onto the first roll (200) is kept constant, by use of an air piston (350) connected to a pivot (360) that connects to the blade (300) via a bracket (370). The coater blade (300) spreads out the beads of adhesive (220; not shown in FIG. 2 but see FIG. 1) and also pushes this into the gravure cavities (210; not shown in FIG. 2, but see FIG. 1).

Turning again to FIG. 1, the coater blade (300) is typically positioned passed the lowest point of the first roll (200), i.e. passed 180 of the circle of the first roll (200), in the direction of rotation. Preferred may be that the coater blade is positioned between 180° and 270°, or even 180° and 225°, or even between 190° and 210°.

The first roll (200) with the adhesive (220) now being spread out and pushed into the cavities (210) rotates further to then contact the second roll (400). The second roll (400) supports a web of articles (500), which rotates partially around the second roll (400). As can be seen in FIG. 1, the web of articles (500) travels from below the second roll (400) to rotate around the second roll (400) and exits above the second roll.

Figure 3:
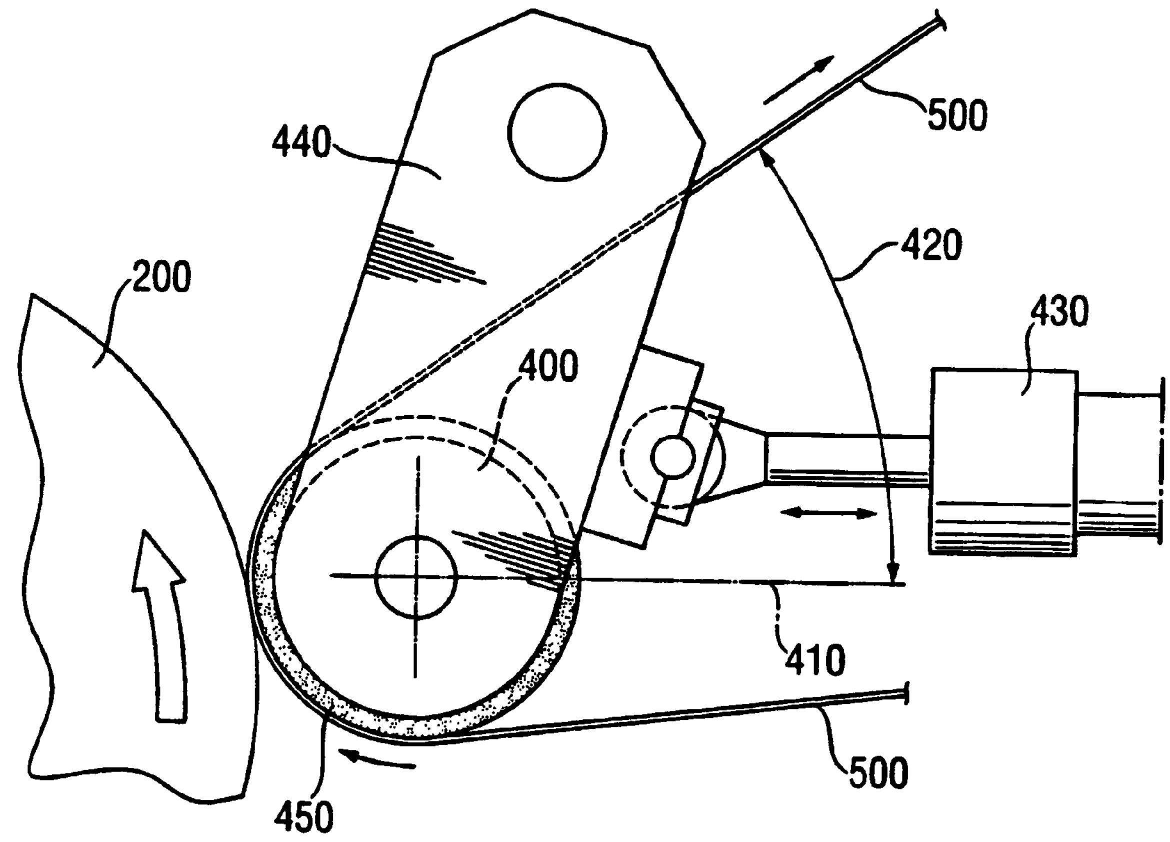
FIG. 3 shows an enlarged, detailed schematic cross-section of the first tool-second tool-arrangement as used herein.

The second roll (400) is shown in more detail in FIG. 3. There, it is shown how the web of articles (500) contacts the first roll (200), whereby the adhesive (220) is transferred onto the web of articles (500; not shown in FIG. 3; but see FIG. 1).

The positioning of the exit angle (420) of the web (500) is important. This exit angle (420) is the angle between the horizontal axis (410) through the center of the second roll (400) and the line of the web (500) upon exit, or if this line is not straight, the tangent to this line. The exit angle (420) is preferably as described above.

The pressure of the web of articles (500) and the second roll (400) is preferably kept constant by use of for example an air piston (430), connected to a bracket (440) which is connected to the second roll (400).

The second roll (400) preferably has specific shore hardness as defined herein above, and thereto it may have a coating (450) of a resilient material, such as rubber Turning back to FIG. 1, the second roll (400) may be positioned any where after the coater (100) in the direction of rotation, and when the coater blade (300) is present, after the coater blade (300). Typically, the second roll (400) is positioned between 225° and 0°, or even 225° and 315°, or even between 250° and 300°, or as shown in FIG. 1, around 270°.

After the adhesive (220) is transferred onto the web of articles (500) on the second roll (400), the first roll (200) rotates further to reach again the coater (100) position so that the process can start again. This is typically done in a continuous manner.

What is claimed is:

1. A process for applying an active material onto an article, series of articles or web of articles, comprising the steps of:

a) applying said active material to a surface of a first tool in the form of a multitude of beads with a coater unit having a multitude of extruder-applicators that are in close proximity to the surface of the tool, and positioned above the surface, said extruder-applicators extruding said active material through a die onto the surface of the first tool;

b) heating the coater unit such that the active material is applied at a temperature of between 70 degrees C. and 250 degrees C.;

c) contacting the surface of the first tool containing the active material, with a coating blade which has an angle of between 5° and 40° with the tangent of the surface of the first tool, and which applies a constant pressure onto the surface with active material; and d) transferring the active material from the surface of the first tool to an article, series of articles or web of articles, supported on a surface of a second tool and pressed against the surface of the first tool, wherein the temperature of the coater is at least 5° C. less than the temperature of the surface of the first tool.

2. The process of claim 1 wherein the first tool and the second tool are each rotating, and wherein at least the first rotating tool is a roll.

3. The process of claim 2 wherein the coater and the first tool are heated and the second tool is cooled.

4. The process of claim 2 wherein the extruder-applicators have a pitch of less than 15mm.

5. The process of claim 2, wherein the surface of the second tool has a temperature of between 0° C. and 30° C.

6. The process of claim 4 wherein the process is continuous, wherein the coater continuously applies a multitude of essentially unbroken lines on the surface of the first rotating tool, wherein the articles are a continuous series or web of articles, and wherein the process has a speed of at least 20 m/min.

7. The process of claim 1 wherein the active material is applied to the article, series of articles or web of articles in an on-dot amount of at least 10 $g/m^2$.

8. The process of claim 2, wherein the surface of the second tool has a shore A hardness value from 25 to 90.

9. The process of claim 2 wherein the web of articles is stretchable and is rotated around said second rotating tool, such that the exit angle of the web is between 30° and 70°.

10. The process of claim 5 wherein the temperature of the surface of the first tool is higher than the melting temperature of the articles, series of articles or web of articles.

* * * * *